United States Patent

Tickner

[11] Patent Number: 5,809,850
[45] Date of Patent: Sep. 22, 1998

[54] COMPACT FLUORESCENT LAMP TOOL

[75] Inventor: Jerold A. Tickner, Phoenix, Ariz.

[73] Assignee: Transition Lighting, Inc., Phoenix, Ariz.

[21] Appl. No.: 767,080

[22] Filed: Dec. 16, 1996

[51] Int. Cl.⁶ ..................................... H01K 3/32
[52] U.S. Cl. ........................ 81/53.11; 81/178; 294/19.1
[58] Field of Search ................... 81/53.1, 53.11, 81/53.12, 121.1, 125, 180.1, 178, 418, 421, 422, 423, 185.1; 294/19.1, 99.1

[56] References Cited

U.S. PATENT DOCUMENTS

| | | | |
|---|---|---|---|
| 606,736 | 7/1898 | Platt et al. | 294/19.1 |
| 616,019 | 12/1898 | Ryder | 81/178 |
| 673,191 | 4/1901 | Arthur | 81/53.1 |
| 1,212,287 | 1/1917 | Upson | 81/178 |
| 2,766,060 | 10/1956 | Fuller | 81/53.11 |
| 4,063,768 | 12/1977 | Denis | 294/19.1 |
| 4,663,996 | 5/1987 | Grudgfield et al. | 81/53.11 |
| 4,679,556 | 7/1987 | Lubock et al. | 294/19.1 |
| 5,317,939 | 6/1994 | Marinescu | 81/53.11 |

FOREIGN PATENT DOCUMENTS 64861  2/1913  Switzerland ............... 81/423

Primary Examiner—David Scherbel
Assistant Examiner—Joni B. Danganan
Attorney, Agent, or Firm—Meschkow & Gresham, P.L.C.; Jordan M. Meschkow; Lowell W. Gresham

[57] ABSTRACT

A tool (20) for manipulation of a compact fluorescent lamp (24) has a body (28) and a lamp holder (30). The body (28) has a coupler (32), for attachment to an extension pole (22), and a base (36), coupled to the coupler (32). The body (28) also has a detent (42) for attachment to the lamp holder (30). The lamp holder (30) is removably attached to the body (28). The lamp holder (30) has a baseplate (46) with a central opening (48) of a shape and size intended to admit a compact fluorescent lamp bulb assembly (44). The baseplate has a collar (50) with at least one protuberance (54) configured to engage the detents (42) on the body (28). The collar (50) has a plurality of grippers (52) axially extending therefrom.

1 Claim, 6 Drawing Sheets

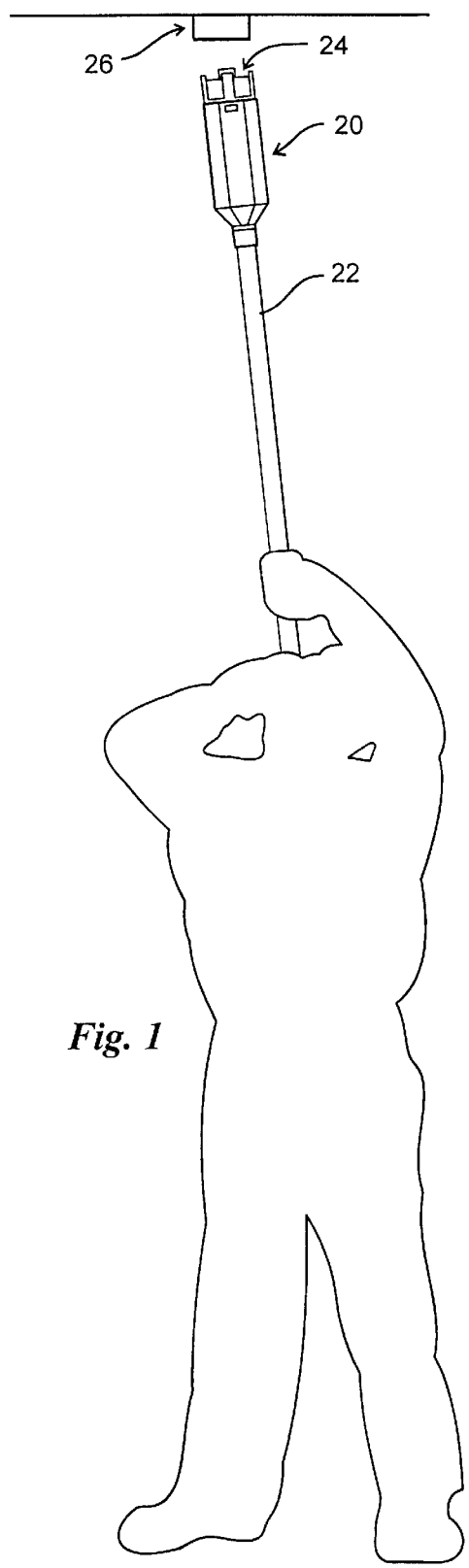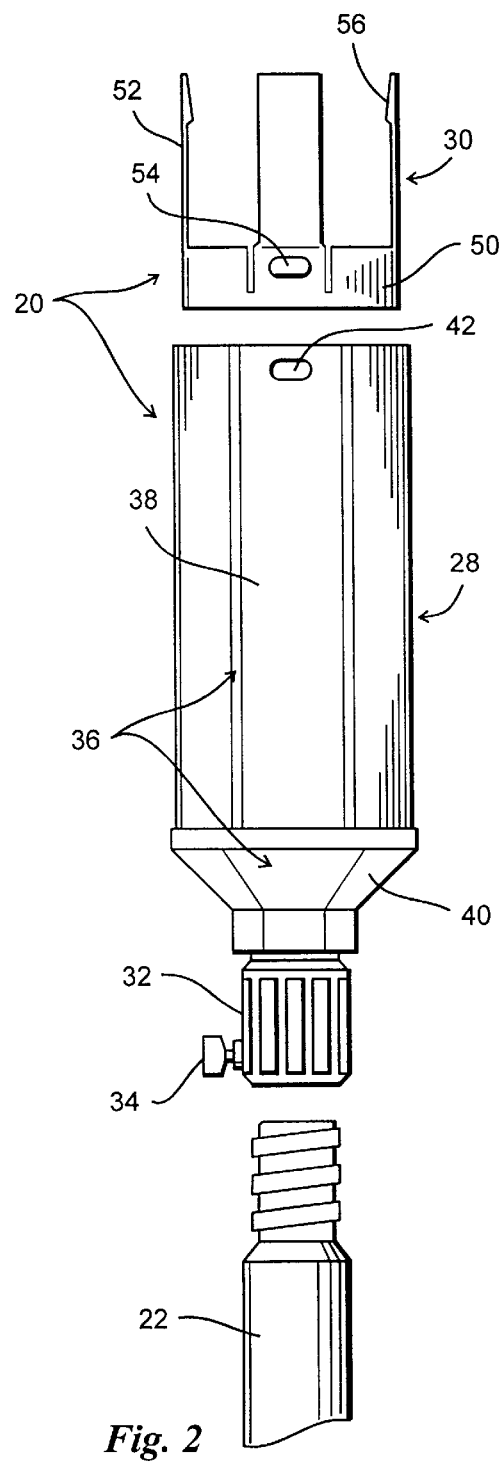

COMPACT FLUORESCENT LAMP TOOL

TECHNICAL FIELD OF THE INVENTION

The present invention pertains to the handling of lamps. More specifically, the present invention relates to the removal and installation of compact fluorescent lamps.

BACKGROUND OF THE INVENTION

The practice of removing, installing, or changing compact fluorescent lamps when those lamps are out of reach of a concerned individual poses several interesting problems, not the least of which are those of convenience and safety.

Standard compact fluorescent lamps fall into two broad categories: unballasted and ballasted. The lamps in each of these categories have differing requirements for removal and installation.

Unballasted compact fluorescent lamps, hereinafter referred to as compact fluorescent lamps, are installed into and removed from bayonet-type sockets by a push-pull action and are typically held in place by spring-loaded detents within the socket itself.

Ballasted compact fluorescent lamps typically use a conventional Edison or medium screw base. Removal or installation of these lamps is accomplished by screwing them into or unscrewing them out of their sockets.

To remove or install either category of compact fluorescent lamps, the individual concerned must first gain access to them. When these lamps are mounted overhead and out of reach this may pose a considerable problem. The individual typically obtains a ladder or erects a platform or scaffold suitable to the task. For many individuals this presents a considerable inconvenience and may cause them to take short-cuts. These short-cuts, such as standing on tables or chairs, are inherently unsafe.

Another problem exists concerning breakage of compact fluorescent lamps. These lamps are constructed with one or more small "U"-shaped (biaxial) glass tubes. The use of these tubes, imposed by the nature of the lamps themselves, cause compact fluorescent lamps to be inherently more fragile than their more globular incandescent counterparts.

In addition, these glass tubes, besides having inherently thin and fragile walls, also often have weak spots in their walls where the heat required in bending and sealing the tubes during manufacture has cause deformation of the glass and variations in wall thickness. If struck even gently by a hard or sharp object, a glass tube may shatter, scattering small shards and leaving sharp edges.

Furthermore, these glass tubes are typically affixed only to the lamp base, and are without support otherwise. As some of these tubes can be quite long relative to their diameter, the application of even small lateral forces at or near the free ends of these tubes may, through the leverage involved, cause the tubes to shatter. This is especially problematical with multi-tube lamps. An application of centripetal forces may cause the ends of the tubes to flex towards each other, with the result that one or more of the tubes may shatter. Such centripetal forces would be applied were one to grasp the lamp by its tubes, either by a hand or through the misapplication of a device such as an incandescent lamp puller. Most incandescent lamp pullers are designed for globular lamps and use a gripping action. This action may exert significant forces upon the lamp: fine for the stronger globular shape of incandescent lamps but potentially disastrous for the small tubes of compact fluorescent lamps. Surprisingly little force is required to shatter the tubes.

The hazard posed by a shattered lamp may be considerably greater that that posed by a shattered incandescent lamp under similar conditions. In addition to the risk of laceration posed by the glass itself, the phosphors used to coat the insides of fluorescent lamp tubes are inherently toxic and present the additional risk of toxic reaction and inflammation.

Should one or more tubes shatter, the resultant shards and sharp edges pose a health hazard. This hazard is magnified should that lamp be overhead, as the resultant shards of phosphor-coated glass may precipitate upon an individual below the lamp, posing a direct danger to eyes and face, and torso should glass go down the person's neck.

If a compact fluorescent lamp is removed or installed by hand, the health risk due to breakage is increased manyfold. Were the glass tubes to be inadvertently struck by a ring or tool, or were excessive centripetal forces applied while grasping the lamp, it may shatter within the individual's hand. If the power is on, the danger of electrical shock or burns may also be present.

What is needed is a safe, easily implemented tool for the removal or installation of a variety of compact fluorescent lamps, especially when such lamps overhead or out of reach.

SUMMARY OF THE INVENTION

Accordingly, it is an advantage of the present invention that it is an improved tool for the manipulation of a variety of compact fluorescent lamps.

Another advantage of the present invention may be realized through the use of an extension pole to extend the effective reach of an individual and eliminate the need for ladders or scaffolds when changing overhead lamps.

Also an advantage is that the present invention safely But firmly grips a compact fluorescent lamp during removal, Thus minimizing the likelihood of lamp breakage.

Still another advantage is that compact fluorescent lamps Are cradled gently during installation, as are ballasted compact fluorescent lamps during both removal and installation, thus greatly reducing the chance of lamp breakage.

The above and other advantages may be achieved, in one form, by a compact fluorescent lamp manipulation tool comprising a body and a lamp holder, the lamp holder being removably attached to the body and shaped to conform to a compact fluorescent lamp.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1 shows a compact fluorescent lamp manipulation tool in use;

FIG. 2 shows an exploded side view of a compact fluorescent lamp manipulation tool;

DETAILED DESCRIPTION OF THE PREFERRED EMBODIMENTS

Figure 3:
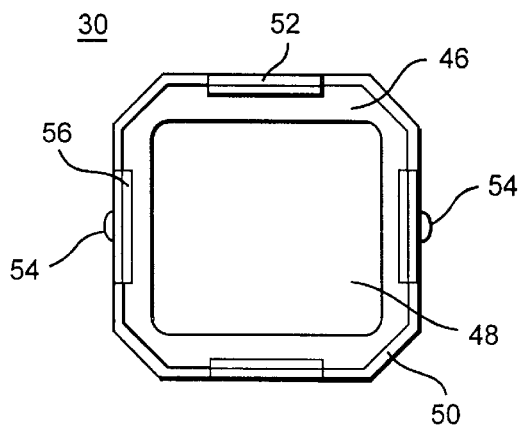
FIG. 3 shows a top view of a lamp holder for triple-biaxial compact fluorescent lamps.

FIG. 1 shows a compact fluorescent lamp manipulation tool 20 in use to remove an overhead compact fluorescent lamp 24 from a lamp socket 26. FIG. 1 illustrates tool 20 and lamp 24 immediately after lamp 24 has been disengaged from socket 26. The use of an extension pole 22 allowed the user to reach lamp 24 even though it was well out of reach. Similarly, tool 20 may be used to install lamp 24 into socket 26.

Extension pole 22 extends the reach of the user. By use of an appropriate extension pole, lamp 24 may be serviced at any reasonable height. The user can keep his of her feet safely on the floor while using the tool.

FIG. 2 shows an exploded side view of tool 20. Tool 20 includes a body 28 and a lamp holder 30. Body 28 has a coupler 32 and a base 36.

Coupler 32 allows tool 20 to be attached to an external extension pole 22. In this embodiment, coupler 32 and extension pole 22 have a standard broom-handle screw fitting, with a locking screw 34 to secure coupler 32 and extension pole 22 against rotation. Those skilled in the art will readily acknowledge that other couplers may be used with other types of extension poles. Indeed, were the extension pole made a part of tool 20, rather than an external device, any type of fitting or no fitting at all may be used.

Base 36 is configured as a tube 38, one end of which has at least one and preferably two detents 42 for engagement with lamp holder 30, and the other end of which is joined to coupler 32. In the embodiment shown, tube 38 is joined to coupler 32 by means of an end cap 40. Those skilled in the art may readily devise alternative methods to join tube 38 to coupler 32.

The following discussion refers to FIGS. 2–4 and 9. Lamp holder 30 is configured to mate with a specific compact fluorescent lamp 24. In the embodiment shown, lamp holder 30 is configured to mate with a 32-watt triple-biaxial lamp. Other configurations would be used for other types of fluorescent lamps.

Lamp holder 30 has a baseplate 46 with a central opening 48. Central opening 48 is configured to conform to the shape of lamp bulb assembly 44 so as to allow passage of bulb assembly 44 through baseplate 46 without binding or otherwise placing pressure upon bulb assembly 44.

Lamp holder 30 also has a collar 50. In the embodiment shown, collar 50 has a plurality of lamp base grippers 52 extending axially from collar 50, each of which ends in a tapered tab 56. Grippers 52 are positioned and spaced so as to mate with the base 58 of lamp 24. Once engaged, tapered tabs 56 hold lamp 24 firmly and securely.

Figure 4:
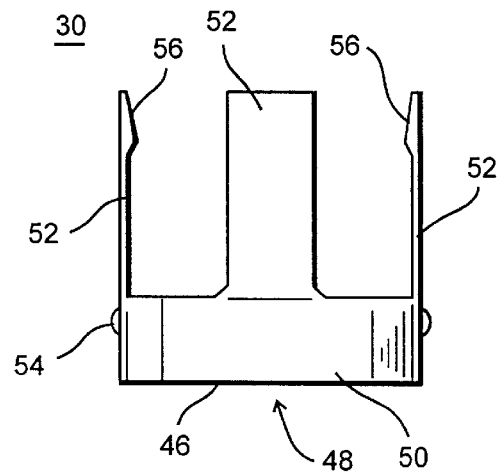
FIG. 4 shows a side view of a lamp holder for triple-biaxial compact fluorescent lamps.

Collar 50 is also of a shape to conform with and fit inside of tube 38. Collar 50 has at least one and preferably two protrusions 54 intended to engage with detents 42 on one end of tube 38. FIGS. 2 and 4 both show side views of lamp holder 30, but the view in FIG. 4 has been rotated ninety degrees from that in FIG. 2 so that protrusions 54 may be more clearly seen.

The shape of collar 50 and protrusions 54 allow lamp holder 30 to be secured into base 36 in either of two positions. In a lamp-removal position, lamp holder 30 is secured into base 36 so that grippers 52 point outward, away from base 36 and generally away from the user. This places grippers 52 in position to engage base 58 and hold lamp 24 securely during removal.

In a lamp-installation position, lamp holder 30 is secured into base 36 so that grippers 52 point inward, towards base 36 and generally towards the user. This places grippers 52 inside tube 38 where they are out of the way, as they are not required to install lamp 24.

Figure 5:
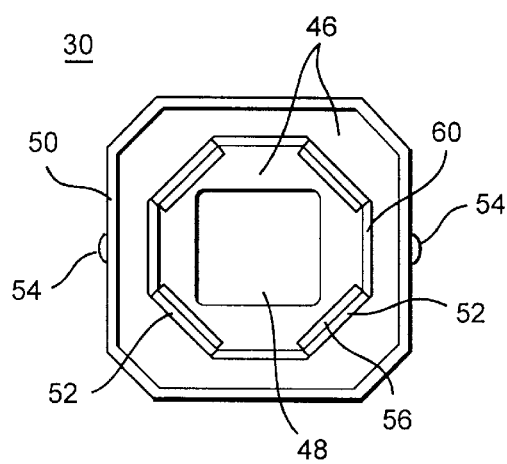
FIG. 5 shows a top view of a lamp holder for twin-biaxial compact fluorescent lamps.
Figure 6:
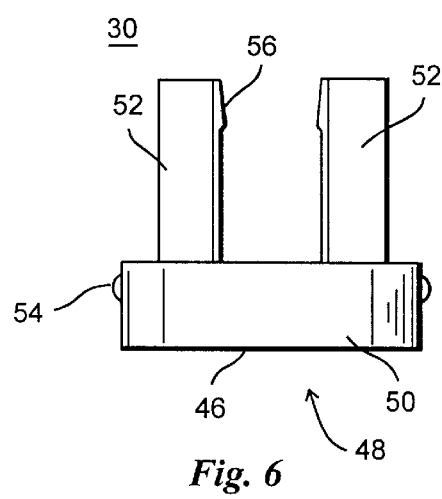
FIG. 6 shows a side view of a lamp holder for twin-biaxial compact fluorescent lamps.
Figure 7:
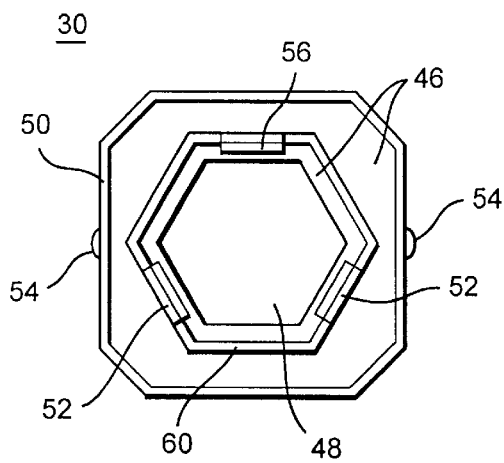
FIG. 7 shows a top view of a lamp holder for "hex"-biaxial compact fluorescent lamps.
Figure 8:
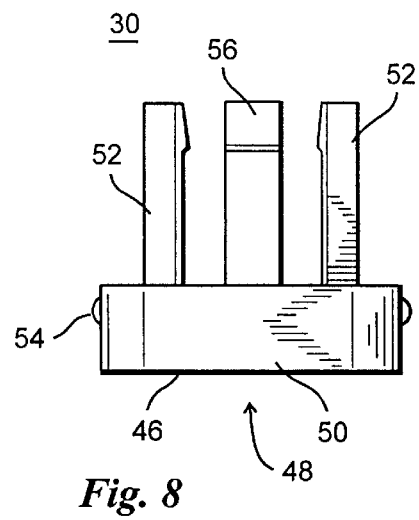
FIG. 8 shows a side view of a lamp holder for "hex"-biaxial compact fluorescent lamps.

FIGS. 3, 5, and 7 show top views of three different embodiments of lamp holder 30, and FIGS. 4, 6, and 8 show side views of the same embodiments, respectively. FIGS. 3 and 4 show lamp holder 30 configured to mate with an industry-standard triple-biaxial compact fluorescent lamp, FIGS. 5 and 6 with an industry-standard twin-biaxial lamp, and FIGS. 7 and 8 with an industry-standard "hex"-biaxial lamp. These three lamp configuration in various wattages account for a significant majority of all compact fluorescent lamps. Those skilled in the art may note that other lamp older configurations may be created for other less common lamps.

All three variations of lamp holder 30 shown in FIGS. 3–8 have similar structure and functionality. Each embodiment of lamp holder 30 has a baseplate 46 with a central opening 48. Each central opening 48 has a size and shape such that it allows full insertion of bulb assembly 44 of its respective variation of lamp 24. The shape of central opening 48 is generally that of a regular polygon conforming to the polygonal shape of a cross-sectional periphery of bulb assembly 44 taken as a unit. The size of central opening 48 should be slightly larger than the cross sectional area of bulb assembly 44, such that bulb assembly 44 may be inserted into central opening 48 without binding, with base 58 in full contact with baseplate 46 and unable to pass through central opening 48. At the same time, the rotational play between bulb assembly 44 and central opening 48 should be kept to a minimum, so that proper rotational torque may be applied through tool 20 and baseplate 46 to bulb assembly 44 so that a ballasted compact fluorescent lamp 24 (see FIG. 12) may be screwed in or out as required.

Figure 9:
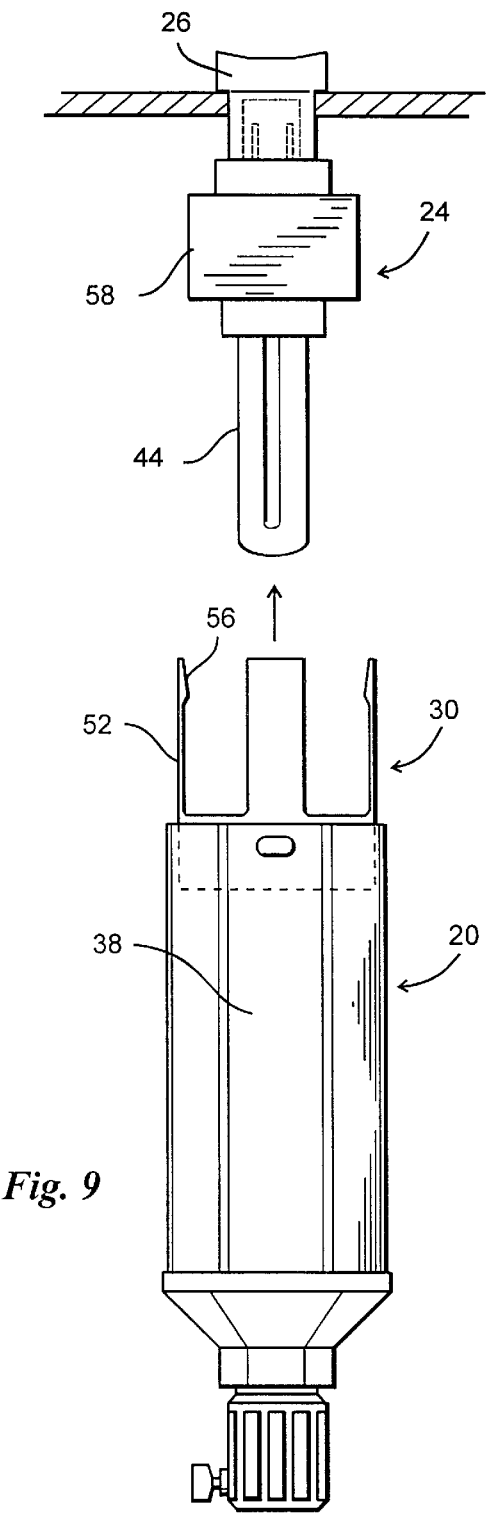
FIG. 9 shows a side view of a compact fluorescent lamp manipulation tool in a lamp-removal configuration immediately prior to lamp removal.

Each embodiment of lamp holder 30 has grippers 52, each of which has a tapered tab 56, configured to firmly engage the base 58 of its respective variation of compact fluorescent lamp 24 (see FIG. 9). Tapered tabs 56 are placed on the free ends of grippers 52, and shaped so as to provide a gentle taper to the inner surface of grippers 52 in an outward direction while providing a steep taper to the inner surface of grippers 52 in an inward direction. Because of this asymmetrical shape, lamp holder 30 is able to smoothly slide over base 58, flexing grippers 52 outward as it does so, then grip base 58 firmly enough to disengage lamp 24 from socket 26 once grippers 52 have completely encompassed base 58 and tapered tabs 56 have snapped into place behind base 58.

Each embodiment of lamp holder 30 has a collar 50 of a shape and size to conform with and fit inside tube 38 (see FIG. 2), with at least one protrusion 54 intended to engage with detents 42 on one end of tube 38.

The differences in the three embodiments shown is in the size and shape of central openings 48, the number and positions of grippers 52, and in the place from where grippers 52 extend. Since a 32-watt triple-biaxial lamp currently has the largest bulb assembly cross-sectional area of common compact fluorescent lamp configurations, bulb assembly 44 as shown in FIGS. 3 and 4 has indirectly defined the size and shape of tube 38 (see FIG. 2) and collar 50. As a result, grippers 52 are shown formed as extensions of collar 50 in FIGS. 2–4.

Desirably, all embodiments of lamp holder 30 have a common size and shape for collar 50. Twin-biaxial and "hex"-biaxial lamps, however, have smaller bases 58 than triple-biaxial lamps. The embodiments of lamp holder 30 shown in FIGS. 5–8 have grippers 52 positioned so as to encompass those smaller bases. This has been accomplished by having a base ring 60 with grippers 52 extending from base ring 60. Base ring 60 is mounted to baseplate 46 between central opening 48 and collar 50. While these approaches are preferred embodiments, those skilled in the art may create lamp holders 30 in other configurations.

Figure 10:
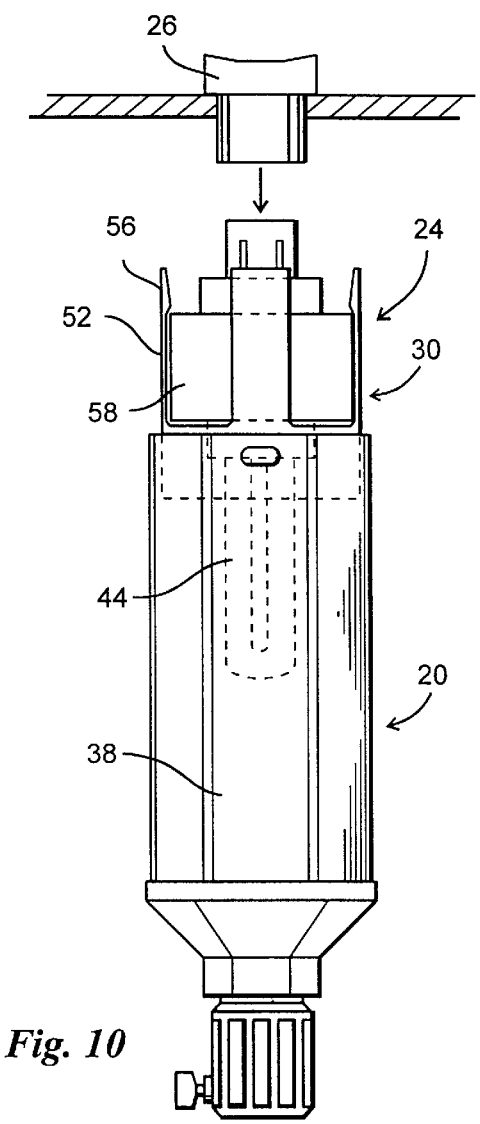
FIG. 10 shows a side view of a compact fluorescent lamp manipulation tool in lamp-removal configuration immediately after lamp removal.
Figure 11:
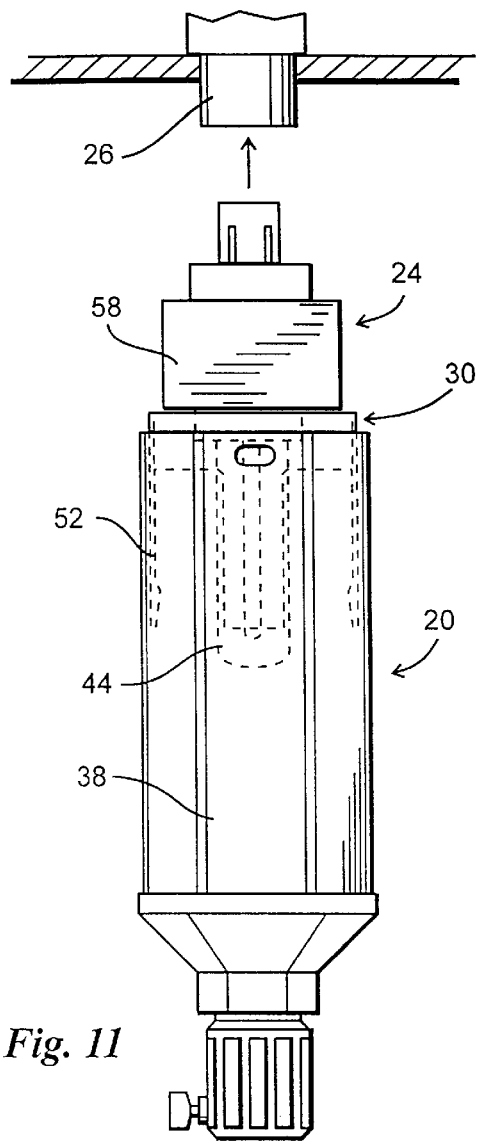
FIG. 11 shows a side view of a compact fluorescent lamp manipulation tool in a lamp-installation configuration immediately prior to lamp installation.

FIGS. 9–11 show side views of tool 20 in operation. Lamp holder 30 is shown in the lamp-removal position in FIGS. 9 and 10, and in the lamp-installation position in FIG. 11. Referring to these figures, the removal and installation of an unballasted compact fluorescent lamp 24 is as described below.

Referring to FIG. 9, to remove lamp 24 from socket 26, lamp holder 30 is engaged into tube 38 in the lamp-removal position. Tool 20 is then moved upward over lamp 24, allowing bulb assembly 44 to pass through central opening 48 (see FIGS. 3 and 4) and into tube 38 until grippers 52 engage lamp base 58 and tapered tabs 56 snap into place. Lamp 24 is now secured in lamp holder 30.

Referring to FIG. 10, tool 20 is then moved downward smoothly and gently until lamp 24 disconnects from socket 26. The removal of lamp 24 is complete. Lamp 24 can be manually extracted from lamp holder 30 by slightly spreading grippers 52 and pulling lamp 24 apart from lamp holder 30.

Referring to FIG. 11, to install a lamp 24 into a socket 26, lamp holder 30 is engaged into tube 28 in a lamp-installation position. This places grippers 52 inside tube 38 and out of the way, as they play no part in lamp installation. Bulb assembly 44 of lamp 24 is then inserted fully into central opening 48 (see FIGS. 3 and 4), bringing base 58 in contact with baseplate 46 (See FIGS. 3 and 4). Tool 20 is then moved upward until lamp 24 has engaged and been secured into socket 26. Tool 20 is then lowered until clear of lamp 24. The installation of lamp 24 is complete.

During installation, lamp bulb assembly 44 is fully inserted through central opening 48 and into tube 38. Base 58 of lamp 24 is in physical contact with baseplate 46 and the entirety of bulb assembly 44 is inside tube 38. Desirably, tube 38 is longer than the longest bulb assembly 44 to be installed. For use with current industry standard lamps 24, tube 38 is desirably no shorter than 5½".

Figure 12:
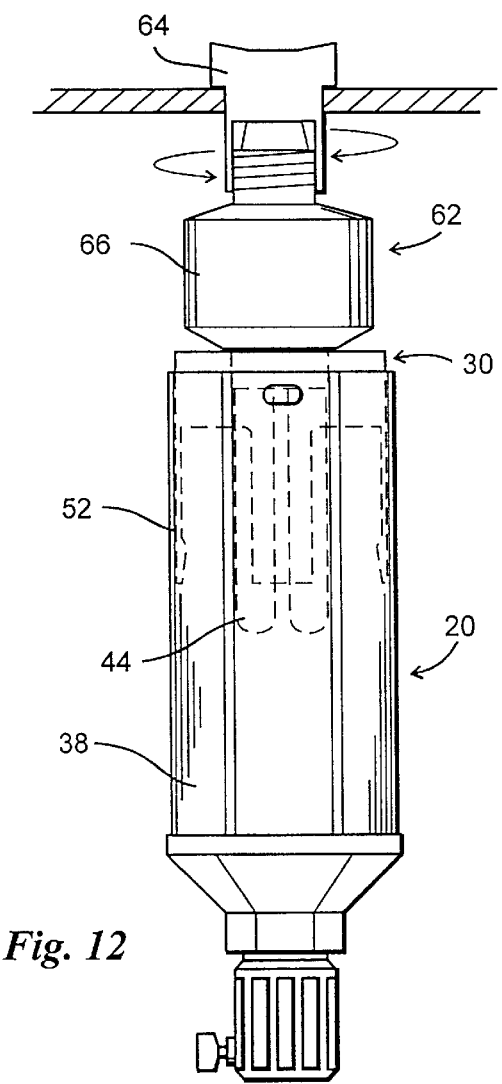
FIG. 12 shows a side view of a compact fluorescent lamp manipulation tool in a ballasted-lamp configuration.

FIG. 12 shows a side view of tool 20 removing or installing a ballasted (screw-type) compact fluorescent lamp 62. To configure tool 20 for ballasted lamp 62, lamp holder 30 is engaged into tube 38 in a ballasted-lamp position, with grippers 52 pointing inward. The ballasted-lamp position is identical to the lamp-installation position already discussed.

Referring to FIG. 12, to remove a ballasted lamp 62 from a socket 64, lamp holder 30 is engaged into tube 38 in the ballasted-lamp position. Tool 20 is moved upward over lamp 62, allowing bulb assembly 44 to pass fully through central opening 48 (see FIGS. 3 and 4) and into tube 38, bringing lamp base 66 in contact with baseplate 46. Tool 20 and lamp 62 are then turned in a counterclockwise direction until lamp 62 is disconnected from socket 64. The removal of lamp 64 is complete. Lamp 62 is then withdrawn from lamp holder 30.

Continuing to refer to FIG. 12, to install a ballasted lamp 62 into a socket 64, lamp holder 30 is engaged into tube 28 in the ballasted-lamp position. Bulb assembly 44 of lamp 62 is inserted fully into central opening 48 (see FIGS. 3 and 4), bringing base 58 in contact with baseplate 46. Tool 20 is moved upward until lamp 62 makes contact with socket 64. Tool 20 and lamp 62 are turned in a clockwise direction until lamp 62 is completely seated into socket 64. Tool 20 is then lowered until clear of lamp 62. The installation of lamp 62 is complete.

Figure 13:
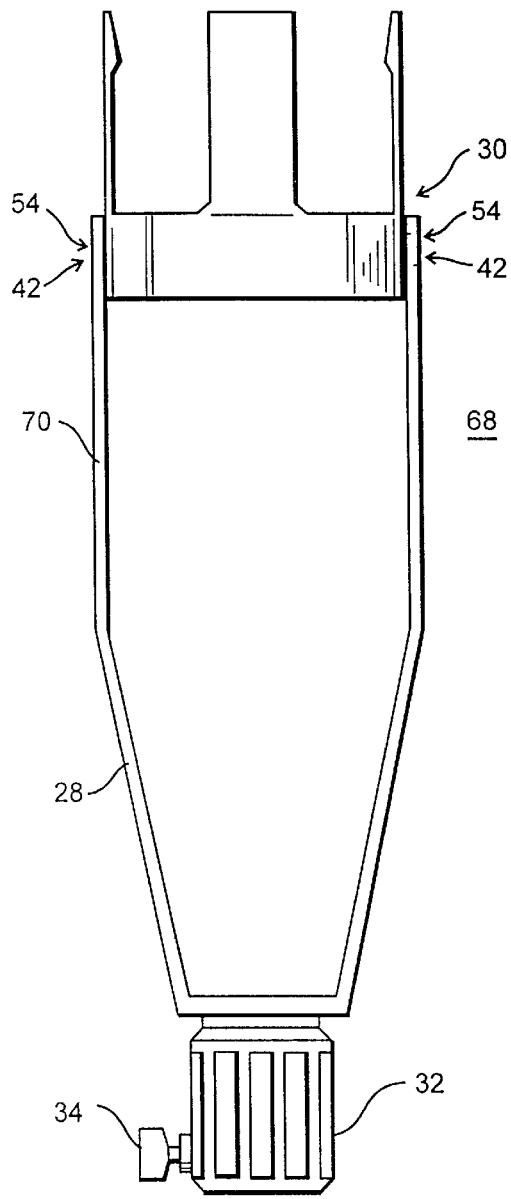
FIG. 13 shows a side view of a "tubeless" embodiment of a compact fluorescent lamp manipulation tool in lamp-removal configuration.
Figure 14:
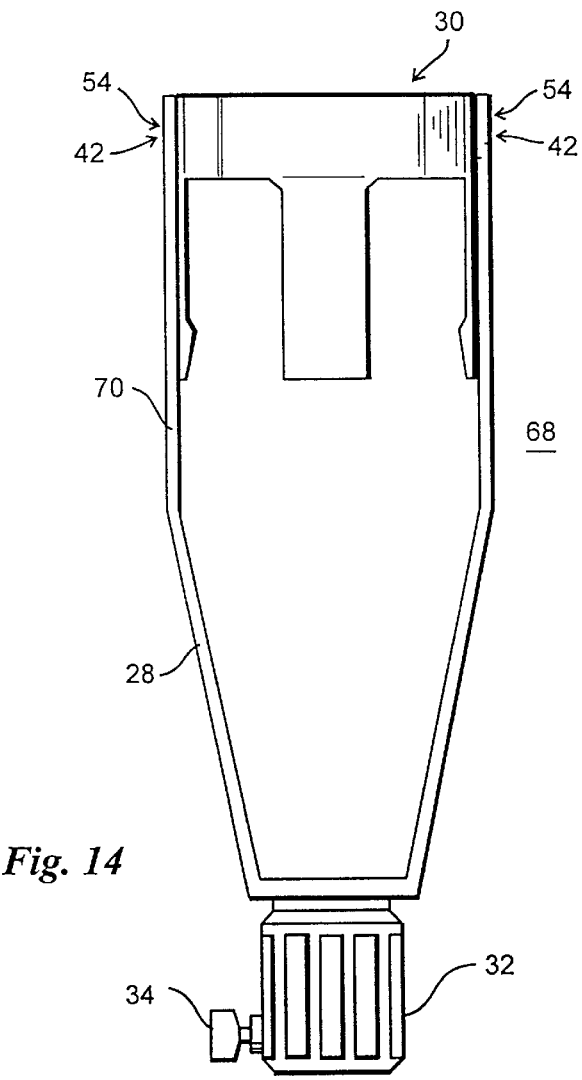
FIG. 14 shows a side view of a "tubeless" embodiment of a compact fluorescent lamp manipulation tool in lamp-installation configuration.

FIG. 13 shows a side view of a "tubeless" embodiment of a compact fluorescent lamp manipulation tool 68 with lamp holder 30 in the lamp-removal position. FIG. 14 shows a side view of tool 68 with lamp holder 30 in the lamp-installation position. In this embodiment, body 28 has been configured as an open-frame fork 70. As with the embodiments already discussed, lamp holder 30 has at least one protuberance 54 intended to engage one or more detents 42 in fork 70 and secure lamp holder 30 in either of the two positions.

Those skilled in the art could easily create body shapes and types. Similarly, those skilled in the art can easily create ways other than detent-and-protuberance for securing lamp holder 30 in the required two positions.

Figure 15:
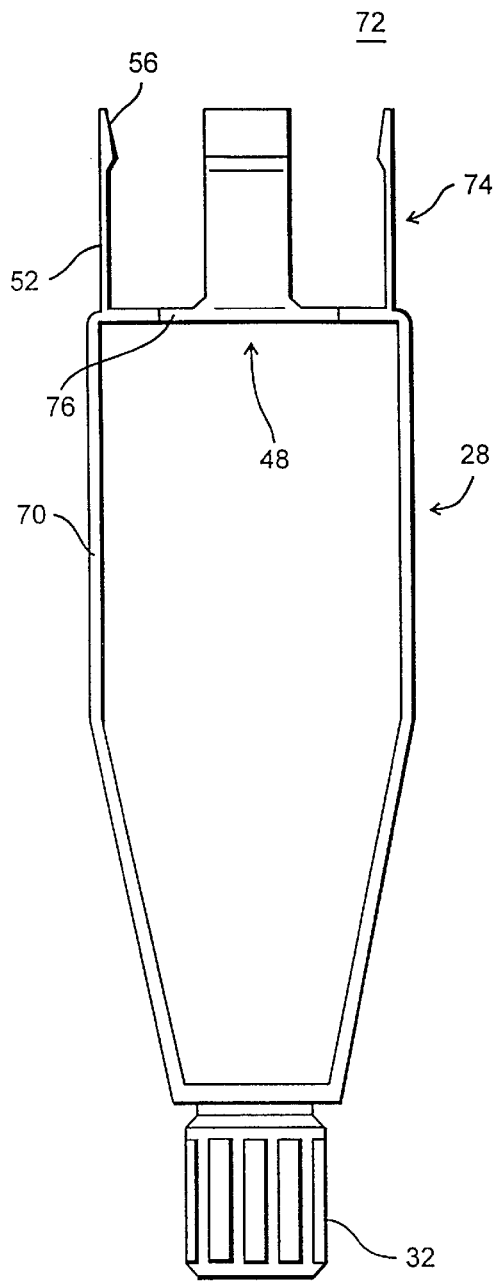
FIG. 15 shows a side view of a "tubeless" embodiment of a compact fluorescent lamp removal tool.

FIG. 15 shows a side view of a "tubeless" embodiment of a removal tool 72 for an unballasted compact fluorescent lamp 24, having a body 28 in the form of a fork 70, a coupler 32, and a removal lamp holder 74. Removal lamp holder 74 is made up of a baseplate 76, a plurality of grippers 52 with tapered tabs 56, and a central opening 48. In this embodiment, grippers 52 are fixed in the equivalent of the above-discussed lamp-removal position.

Figure 16:
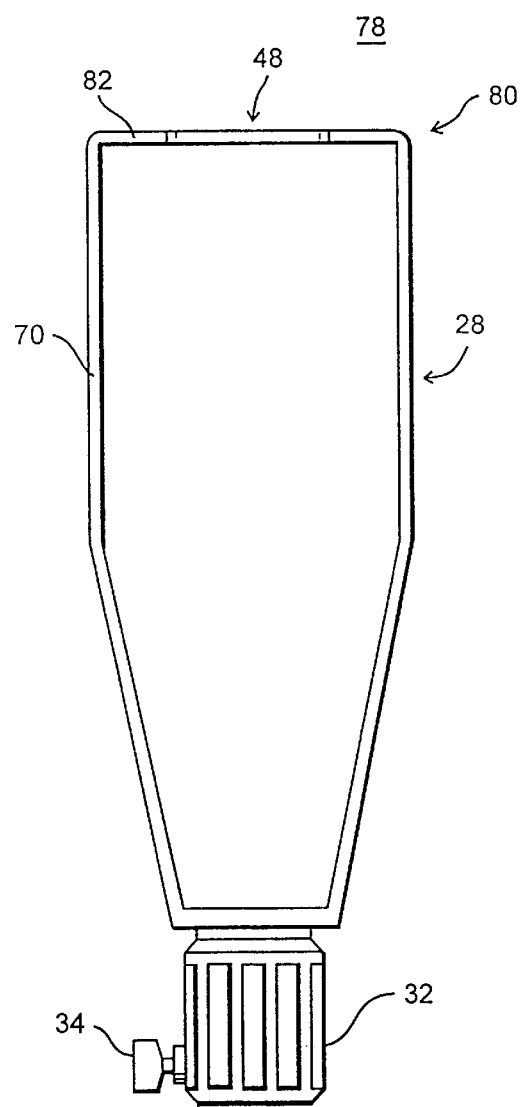
FIG. 16 shows a side view of a "tubeless" embodiment of a compact fluorescent lamp installation tool.

FIG. 16 shows a side view of a "tubeless" embodiment of a installation tool 78 for an unballasted compact fluorescent lamp 24, having a body 28 in the form of a fork 70, a coupler 32, and an installation lamp holder 80. Installation lamp holder 80 is made up of a baseplate 82 and a central opening 48, no grippers 52 are required.

The installation tool 80 shown in FIG. 16 may also be taken to be a "tubeless" embodiment of a tool 80 for the removal or installation of a ballasted compact fluorescent lamp 62, similar to that previously discussed.

In summary, the present invention is an improved compact fluorescent manipulation tool 20 which, together with an external extension pole 22, provides an easy and safe method for the removal and installation of various types of compact fluorescent lamps 24 from an overhead or out-of-reach position. Although the preferred embodiments of the invention have been illustrated and described in detail, it will be readily apparent to those skilled in the art that various modifications may be made therein without departing from the spirit of the invention or from the scope of the appended claims.

What is claimed is:

1. A method of manipulating an unballasted compact fluorescent lamp in cooperation with a compact fluorescent lamp socket, said method comprising the steps of:

prov333ing a manipulation tool having a body and a lamp holder removably attached to said body and configured to encompass said compact fluorescent lamp substantially without placing pressure upon a lamp bulb assembly portion of said compact fluorescent lamp and to mate with a lamp base portion of said compact fluorescent lamp to secure said compact fluorescent lamp in said lamp holder;

attaching said lamp holder to said body in a first direction to remove said compact fluorescent lamp from said compact fluorescent lamp socket, said first direction allowing said lamp holder to mate with said lamp base and secure said compact fluorescent lamp in said lamp holder; and attaching said lamp holder to said body in a second direction to install said compact fluorescent lamp into said compact fluorescent lamp socket, said second direction allowing said compact fluorescent lamp bulb assembly to pass within said body and to prevent passage of said lamp base into said body.

* * * * *